US011920547B2

(12) United States Patent
Weindorf et al.

(10) Patent No.: US 11,920,547 B2
(45) Date of Patent: Mar. 5, 2024

(54) WATER DRAINAGE DEVICE, FILTER MODULE, AND METHOD

(71) Applicant: MANN+HUMMEL GmbH, Ludwigsburg (DE)

(72) Inventors: Martin Weindorf, Kornwestheim (DE); Rafael Salom, Remseck (DE)

(73) Assignee: MANN+HUMMEL GmbH, Ludwigsburg (DE)

( * ) Notice: Subject to any disclaimer, the term of this patent is extended or adjusted under 35 U.S.C. 154(b) by 0 days.

(21) Appl. No.: 17/685,143

(22) Filed: Mar. 2, 2022

(65) Prior Publication Data

US 2022/0290640 A1 Sep. 15, 2022

(30) Foreign Application Priority Data

Mar. 9, 2021 (DE) ..................... 10 2021 105 694.2

(51) Int. Cl.
*F02M 37/24* (2019.01)
*F02M 37/44* (2019.01)
*F02M 37/46* (2019.01)

(52) U.S. Cl.
CPC ............ *F02M 37/24* (2019.01); *F02M 37/44* (2019.01); *F02M 37/46* (2019.01)

(58) Field of Classification Search
CPC ........ F02M 37/24; F02M 37/44; F02M 37/46; F02M 37/28
See application file for complete search history.

(56) References Cited

U.S. PATENT DOCUMENTS

| | | | | |
|---|---|---|---|---|
| 1,766,917 | A | 6/1930 | Marks | |
| 2,243,988 | A * | 6/1941 | Stone | B01D 17/0214 210/114 |
| 5,855,772 | A | 1/1999 | Miller et al. | |
| 2005/0005584 | A1 | 1/2005 | Decaux | |
| 2005/0188846 | A1 * | 9/2005 | Carruthers | B01J 20/28042 96/108 |
| 2010/0258489 | A1 | 10/2010 | Decaux | |
| 2013/0056408 | A1 | 3/2013 | Buchner et al. | |

FOREIGN PATENT DOCUMENTS

| | | | |
|---|---|---|---|
| EP | 1544453 | A2 | 6/2005 |
| FR | 2882661 | A1 | 9/2006 |
| JP | 63125169 | A | 5/1988 |
| WO | 8905685 | A1 | 6/1989 |

* cited by examiner

*Primary Examiner* — Waqaas Ali

(57) ABSTRACT

A water drainage device for a filter module is provided with a valve housing that has a valve bore, a valve body received at least in sections in the valve bore, an actuation rod for actuating the valve body, and a coupling device operatively connecting the actuation rod with the valve body and enabling a tilting of the actuation rod in relation to the valve body. The water drainage device can be transferred from a closed state, in which the valve body seals in relation to the valve seat of the valve bore, into an open state, in which the valve body is lifted off the valve seat, and in reverse. The filter module has a filter housing with a housing top part. The valve body, upon transfer of the water drainage device from closed state into open state, moves toward the housing top part of the filter housing.

14 Claims, 4 Drawing Sheets

WATER DRAINAGE DEVICE, FILTER MODULE, AND METHOD

BACKGROUND OF THE INVENTION

The present invention concerns a water drainage device for a filter module, in particular for a fuel filter module, a filter module, in particular a fuel filter module, with such a water drainage device, and a method for actuating a water drainage device of a filter module, in particular of a fuel filter module.

Fuel of internal combustion engines usually comprises a water proportion that is harmful for modern injection systems and therefore must be separated by suitable filter systems. Due to its higher specific weight in comparison to the specific weight of fuel, this water proportion collects usually at the lowest point of a filter housing of a fuel filter. In order to prevent that this separated water proportion surpasses a maximum level and is conveyed farther in the fuel system, it must be possible to drain this water proportion after sensing by a water sensor or at the latest in intervals during servicing.

EP 1 544 453 A2 discloses a valve arrangement for draining water from the housing of a fuel filter, comprised of a housing, at which at a lateral low point a drainage opening is arranged, wherein into the drainage opening at the same time a cylindrical bore opens which is arranged in the housing wall and creates a connection to the environment side, wherein in the cylindrical bore, at a point which is geodetically positioned above the drainage opening, a connection hole to the housing interior is arranged, wherein in the bore an axially movable cylinder pin is arranged in such a way that the cylinder pin closes the drainage opening by an axial pressure with a seal element, arranged at the end face, and closes off the bore in the region above the connection hole at the same time by a seal arranged at the cylinder pin.

SUMMARY OF THE INVENTION

In view of this background, the present invention has the object to provide an improved water drainage device for a filter module.

Accordingly, a water drainage device for a filter module, in particular for a fuel filter module, is proposed. The water drainage device comprises a valve housing that comprises a valve bore, a valve body that, at least in sections thereof, is received in the valve bore, an actuation rod for actuation of the valve body, and a coupling device that operatively connects the actuation rod to the valve body and that enables a tilting movement of the actuation rod in relation to the valve body, wherein the water drainage device can be transferred from a closed state, in which the valve body seals in relation to a valve seat of the valve bore, into an open state, in which the valve body is lifted off the valve seat, and in reverse.

In other words, the coupling device enables an angular offset compensation with at least one rotatory degree of freedom between the actuation rod and the valve body. Preferably, the coupling device enables an angular offset compensation with two rotatory degrees of freedom between the actuation rod and the valve body.

In embodiments, the actuation rod is coupled fixedly to the valve body by the coupling device in relation to a rotatory degree of freedom that is oriented about the longitudinal axis of the valve body. In this way, a torque transmission from the actuation rod to the valve body is enabled.

Since the coupling device enables a tilting movement of the actuation rod in relation to the valve body, it is possible to achieve an alignment compensation when the valve body, upon transfer thereof from the closed state into the open state, is moved out of the valve housing. In this way, a collision of the actuation rod with other components is avoided.

The filter module can also be referred to as filter system. The filter module is suitable for filtering fuel, for example, diesel, gasoline, or kerosene. The filter module however can also be suitable for filtering any type of fluid. The valve housing is preferably tubular and substantially configured with rotational symmetry to a center or symmetry axis of the valve bore. The valve bore is a stepped bore or bore with steps. That the valve body is “at least in sections thereof” received in the valve bore means presently that the valve body at least partially can also be arranged outside of the valve bore. This means in particular that the valve housing accommodates in it the valve body at least in sections thereof.

The valve body is preferably of rotational symmetry in relation to the symmetry axis of the valve bore. Like the valve bore, the valve body comprises preferably a stepped geometry. The valve body, at least in sections thereof, can be of a hollow shape. In the closed state, the valve body seals relative to the valve seat of the valve bore such that no water can flow through the water drainage device or through the valve bore. In the open state, on the other hand, in which the valve body is lifted off the valve seat, the water can flow through the water drainage device and in particular the valve bore.

That the coupling device “operatively connects” the actuation rod to the valve body means presently that the coupling device is suitable for applying a torque from the actuation rod to the valve body in order to rotate the latter. The coupling device can be any arbitrary coupling device which is suitable for enabling a tilting movement of the actuation rod relative to the valve body. In the simplest case, the coupling device can be, for example, a sleeve-shaped element which, for example, is manufactured of an elastomer such as rubber. Preferably, the coupling device is a universal joint or cardan joint.

In embodiments, the valve body, upon transfer of the water drainage device from the closed state into the open state, moves linearly along a symmetry axis of the valve bore and away from the valve seat opposite or at a slant to a direction of gravity in upward direction. That the valve body upon transfer of the water drainage device from the closed state into the open state moves “linearly” along the symmetry axis of the valve bore means presently in particular that the valve body carries out a translatory movement, respectively, a movement along a straight line, namely the symmetry axis. This can be realized, for example, in that the valve body is linearly displaced in the valve bore. That the valve body moves “in upward direction” means presently that, for an intended mounting or for an intended installation of the water drainage device, the latter is arranged in such a way that the valve body upon transfer of the water drainage device from the closed state into the open state moves opposite or at a slant to the direction of gravity. In this embodiment, the thread section and the counter thread section are preferably embodied right-handed because the valve body for opening (counterclockwise direction) is to be moved upwardly (analog to a normal screw).

In embodiments, the valve bore widens viewed opposite to the direction of gravity. This means in particular that a diameter of the valve bore becomes larger, viewed along the symmetry axis thereof or opposite to the direction of gravity. For this purpose, the valve bore is preferably embodied as a stepped bore or a bore with steps.

In embodiments, the coupling device comprises a first axle about which the actuation rod can be tilted in relation to the valve body, and a second axle about which the actuation rod can be tilted in relation to the valve body, wherein the first axle and the second axle are oriented perpendicularly to each other. In this way, two rotatory degrees of freedom for the actuation rod result, namely about the first axle and about the second axle. “Perpendicular” is to be understood presently as an angle of 90°±10°, preferably of 90°±5°, further preferred of 90°±3°, further preferred of 90°±1°, and further preferred precisely 90°.

In embodiments, the first axle is attached to the valve body wherein the second axle is attached to a connection piece which is connected to the actuation rod. This means in particular that the valve body comprises the first axle. For example, the first axle is integrally formed at the valve body. Accordingly, the second axle is integrally formed at the connection piece. The connection piece receives an end section of the actuation rod. The end section of the actuation rod is fixedly connected to the connection piece.

In embodiments, the coupling device comprises an intermediate member that is connected to the first axle and the second axle. The intermediate member can also be referred to as a crosspiece. The intermediate member comprises cutouts or grooves in which the first axle and the second axle are received. For example, the first axle and the second axle are locked or clipped in the intermediate member.

In embodiments, the valve bore comprises a thread section and the valve body comprises a counter thread section corresponding to the thread section, wherein the thread section and the counter thread section are interacting in such a way that they convert a rotational movement of the valve body in relation to the valve housing into a linear movement of the valve body in the valve bore. In particular, the rotational movement of the valve body is converted into a linear movement of the valve body along the symmetry axis of the valve body. The thread section is preferably an inner thread. The counter thread section is accordingly an outer thread provided on the valve body. The thread section and the counter thread section interact in such a way with each other that, upon rotational movement of the valve body in relation to the valve housing, the valve body moves linearly along the symmetry axis. Depending on the rotational direction, the valve body can be moved either into the valve housing in order to transfer the water drainage device into the closed state or the valve body can be moved out of the valve housing in order to transfer the water drainage device from the closed state into the open state. The thread section and the counter thread section can be left-handed. Alternatively, the thread section and the counter thread section can also be right-handed. Instead of the thread section and the counter thread section, for example, a bayonet closure can also be provided which also makes it possible to convert a rotational movement of the valve body in relation to the valve housing into a linear movement.

In embodiments, the actuation rod comprise a handwheel, remote from the coupling device. The handwheel is mounted to an end section of the actuation rod which is facing away from the connection piece of the coupling device. In particular, the handwheel is mounted in the region of a housing top part of a filter housing of the filter module. In this way, it is possible to actuate the water drainage device easily from above.

In embodiments, the valve body comprises a first seal element that seals relative to the valve seat in axial direction in the closed state and is lifted off the valve seat in the open state. For example, the first seal element is an O-ring. A circumferential groove which receives this first seal element can be provided for the first seal element at the valve body. “Axial” presently means viewed along the symmetry axis of the valve bore.

In embodiments, the valve body comprises a second seal element that radially seals in relation to a connection section of the valve bore in the closed state and that is arranged outside of the connection section in the open state. The connection section is part of the valve bore. The connection section represents a constriction of the valve bore. “Radial” presently means oriented away from the symmetry axis of the valve bore. Upon transferring the water drainage device from the closed state into the open state, the second seal element is pulled out of the connection section.

In embodiments, the valve bore completely passes through the valve housing so that the valve housing is open at both end faces. This means in particular that, depending on the position of the valve body in the valve bore, the valve body can project from the valve housing at an end face.

In embodiments, the water drainage device comprises moreover a water drainage channel that opens into the valve bore and a water drainage socket that leads out of the valve bore, wherein the valve body interrupts a fluid connection between the water drainage channel and the water drainage socket in the closed state and wherein the valve body releases the fluid connection between the water drainage channel and the water drainage socket in the open state. The water drainage channel is preferably connected to a lowest point of a water collection chamber of the filter housing of the filter module. Preferably, the water collection chamber comprises a bottom which is slanted in the direction toward the water drainage channel.

Moreover, a filter module, in particular a fuel filter module, with such a water drainage device is proposed, wherein the valve body, upon transferring the water drainage device from the closed state into the open state, moves toward a housing top part of a filter housing of the filter module.

The filter module is used preferably in vehicles, in particular in land craft. For example, the filter module can be used in utility vehicles, such as, for example, trucks, construction machines or harvesting machines. In particular, the filter module is suitable for so-called “heavy-duty” applications. The filter module however can also be used in immobile applications, for example, in the building technology. In addition to the housing top part, the filter housing comprises a housing bottom part at which the housing top part is mounted so as to be detachable. The housing bottom part can comprise a filter element receiving region for receiving a filter element. The filter element is suitable for filtering out particles or suspended substances from a fluid to be filtered, for example, fuel. The filter element can be a fuel filter element. Moreover, the filter element is also suitable for separating water from the fluid to be filtered. In addition to the filter element receiving region, the housing bottom part, viewed along the direction of gravity, comprises the water collection chamber arranged below the filter element receiving region and configured to collect the water that has been separated by means of the filter element. The water drainage device can be provided at the water collection chamber. The valve housing can be configured as one piece, in particular monolithic, together with a housing bottom part of the filter housing. “One piece” or “one part” means presently that the valve housing and the housing bottom part are not assembled of different components but form a common component. "Monolithic" means presently that the valve housing and the housing bottom part are manufactured throughout of the same material. For example, the housing bottom part is a plastic component, in particular an injection-molded plastic component. The housing bottom part can however be a metal component, for example, a diecast aluminum component.

In embodiments, a symmetry axis of the filter module and a symmetry axis of the valve bore are positioned at a slant to each other at a slant angle wherein the slant angle is an acute angle. "Acute angle" is to be understood presently as an angle of less than 90°. For example, the slant angle amounts to 10° to 20°.

Moreover, a method for actuation of a water drainage device of a filter module, in particular of a fuel filter module, is proposed. In this context, the water drainage device comprises a valve housing that comprises a valve bore, a valve body that, at least in sections thereof, is received in the valve bore, an actuation rod for actuating the valve body, and a coupling device which operatively connects the actuation rod to the valve body, wherein the water drainage device is transferred from a closed state, in which the valve body seals in relation to a valve seat of the valve bore, into an open state, in which the valve body is lifted off the valve seat, and in reverse, and wherein the actuation rod, upon transfer of the water drainage device from the closed state into the open state and in reverse, is tilted by means of the coupling device in relation to the valve body.

Transferring the water drainage device from the closed state into the open state and in reverse is achieved in particular by a rotational movement of the valve body in relation to the valve housing, as explained supra. This rotational movement is converted by the thread section and the counter thread section corresponding thereto into the linear movement along the symmetry axis of the valve bore. In doing so, the valve body then moves away from the valve seat and opposite or at a slant to the direction of gravity in upward direction. This requires an intended or proper mounting of the water drainage device. The water drainage device is in particular mounted in such a way that the aforementioned water drainage channel, viewed in relation to the direction of gravity, is arranged above the valve seat. When the valve body is lifted off the valve seat, the water to be drained flows from the water collection chamber of the housing bottom part through the water drainage channel, the valve bore, and the water drainage socket into an environment of the water drainage device. In this context, the coupling device enables an alignment compensation such that, when the valve body is moved out of the valve bore, a lateral movement of the actuation rod can be prevented by a tilting action thereof. This has the result that a collision of the actuation rod with other components, for example, in an engine compartment, can be avoided upon actuation of the water drainage device.

BRIEF DESCRIPTION OF THE DRAWINGS

In the Figures, same or functionally the same elements, inasmuch as nothing different is indicated, are provided with the same reference characters.

DESCRIPTION OF PREFERRED EMBODIMENTS

Figure 1:
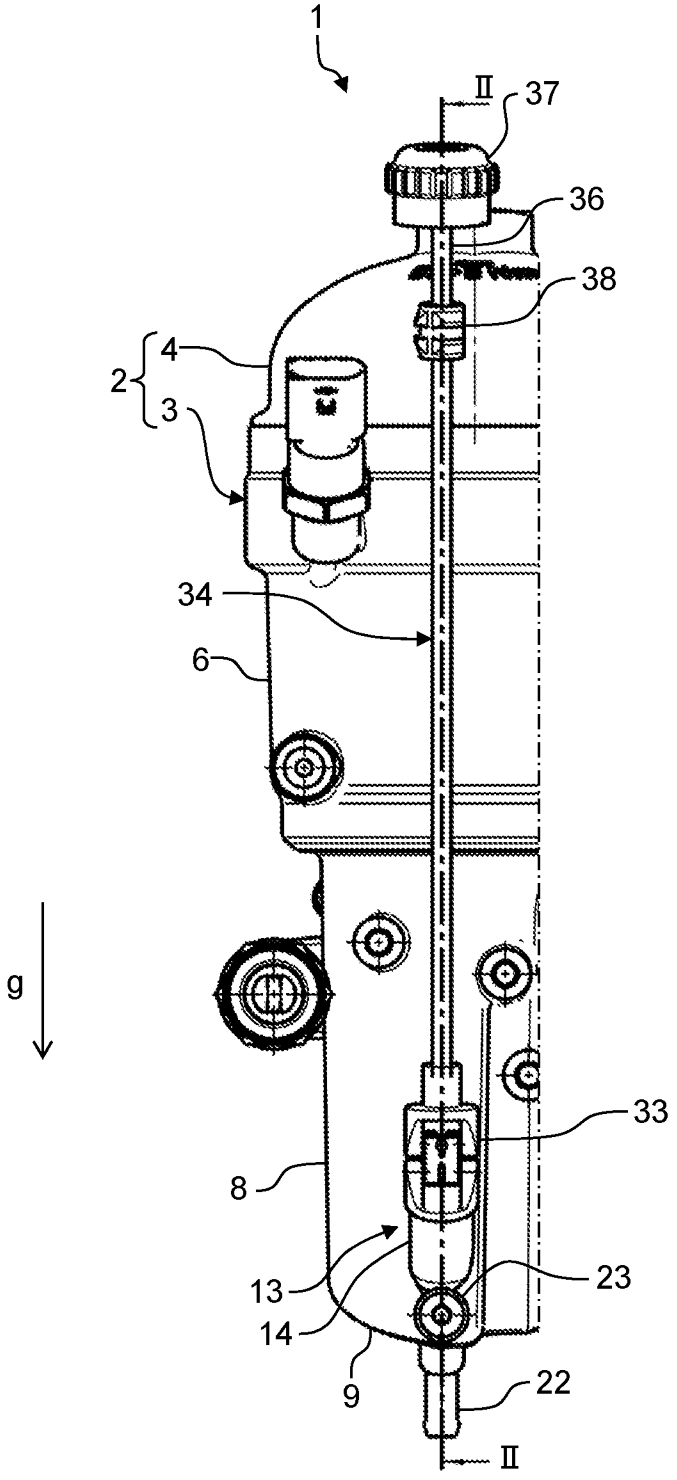
FIG. 1 shows a schematic partial view of an embodiment of a filter module.
Figure 2:
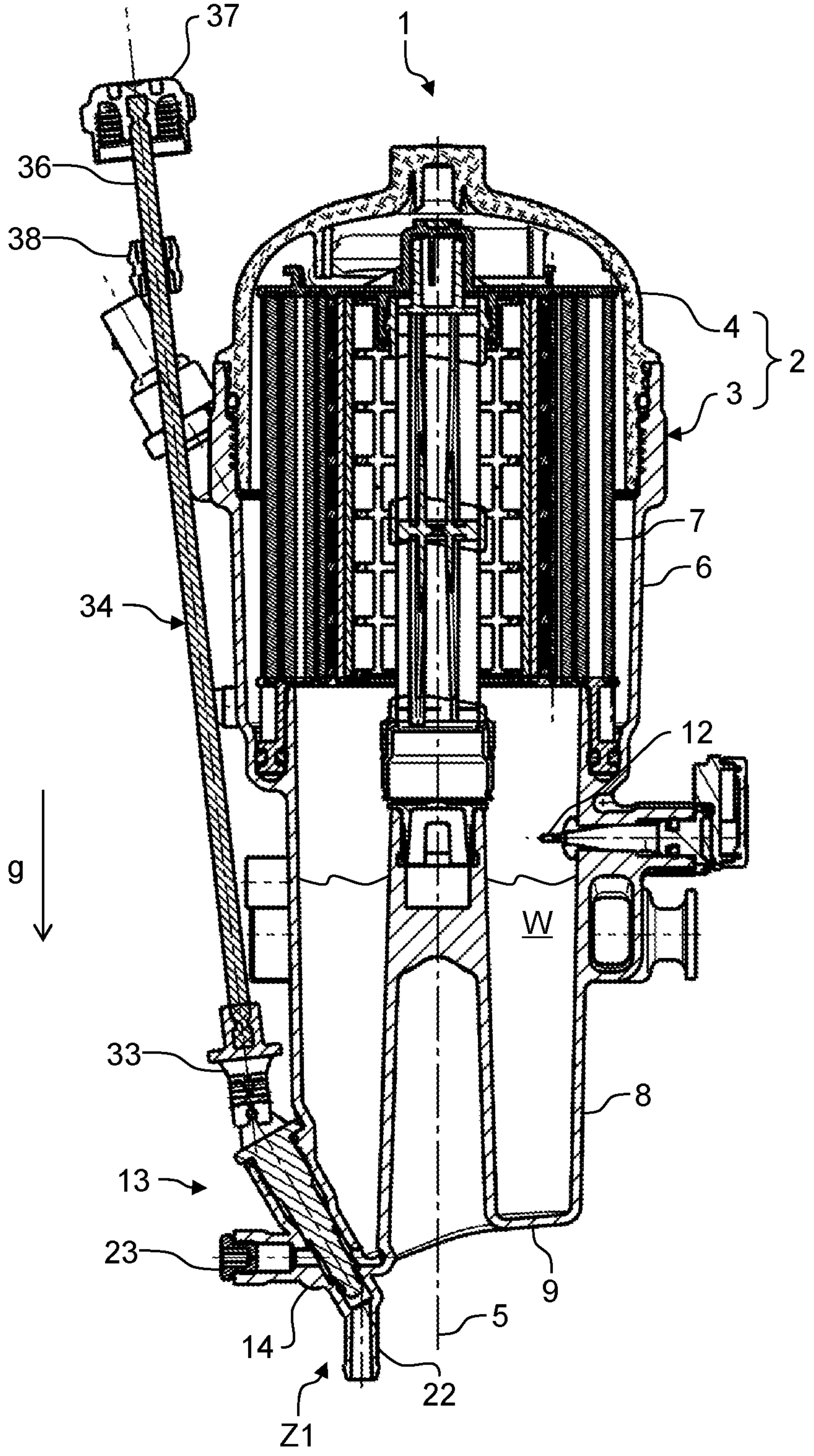
FIG. 2 shows a schematic section view of the filter module according to the section line II-II of FIG. 1.
Figure 3:
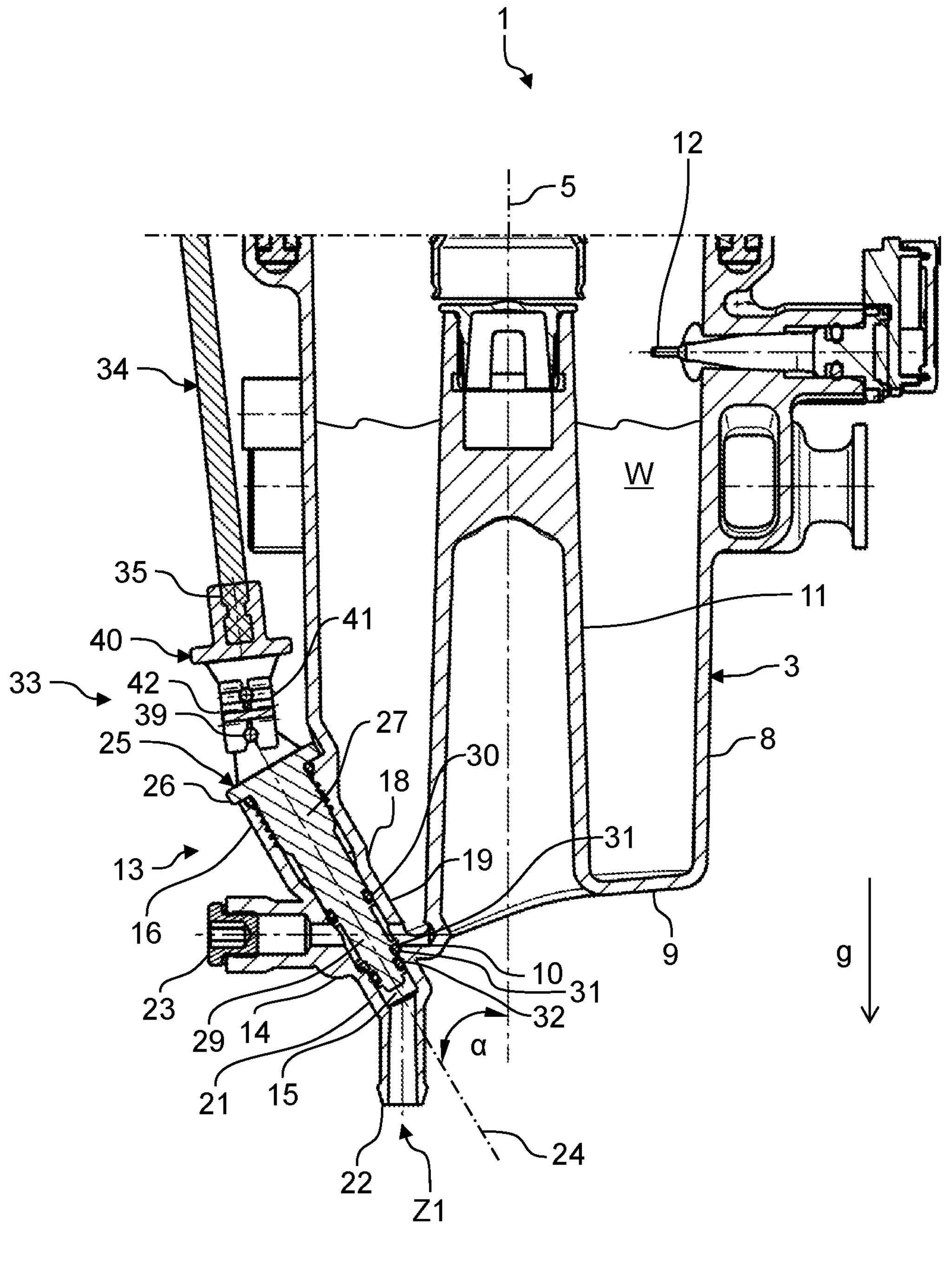
FIG. 3 shows a schematic partial section view of the filter module according to the section line II-II of FIG. 1.
Figure 4:
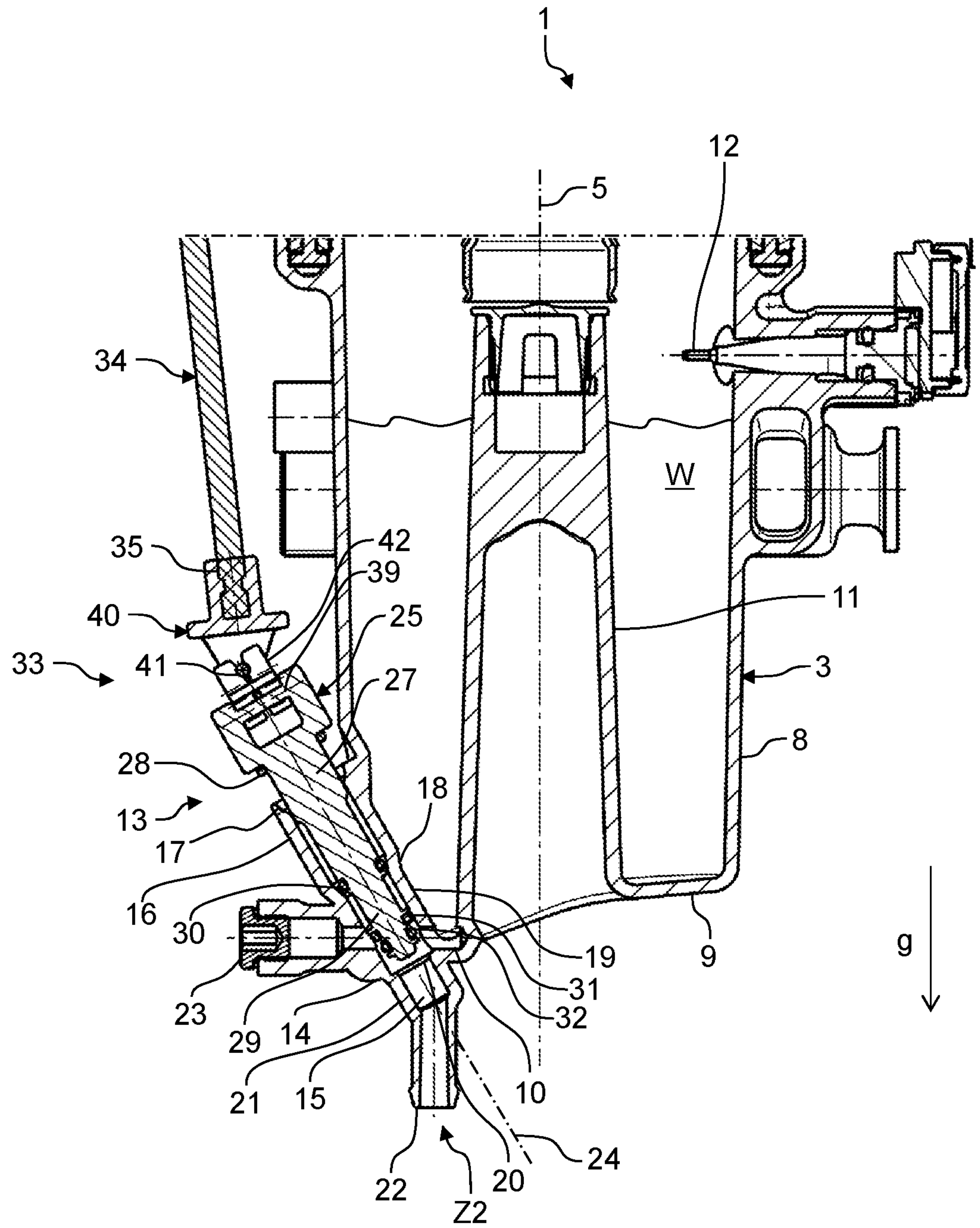
FIG. 4 shows a further schematic partial section view of the filter module according to the section line II-II of FIG. 1.

FIG. 1 shows a schematic partial view of an embodiment of a filter module 1. FIG. 2 shows a schematic section view of the filter module 1 according to the section line II-II of FIG. 1. FIG. 3 shows a schematic partial section view of the filter module 1 according to the section line II-II of FIG. 1. FIG. 4 shows a further schematic partial section view of the filter module 1 according to the section line II-II of FIG. 1. In the following, reference is being had simultaneously to FIGS. 1 to 4.

The filter module 1 can also be referred to as filter or filter system. Preferably, the filter module 1 is a fuel filter module. The filter module 1 can thus be suitable for filtering fuels such as, for example, diesel, gasoline or kerosene. The filter module 1 can however also be suitable for filtering other arbitrary liquid operating substances such as, for example, oil, water, urea solution or the like. The filter module 1 is used preferably in vehicles, in particular in land craft. For example, the filter module 1 can be employed in utility vehicles such as, for example, trucks, construction machines or harvesting machines. In particular, the filter module 1 is suitable for so-called "heavy-duty" applications. The filter module 1 however can also be used in immobile applications, for example, in the building technology.

The filter module 1 comprises a filter housing 2 with a housing bottom part 3 and a housing top part 4 that is removable from the housing bottom part 3. The housing top part 4 can also be referred to as housing cover. The housing bottom part 3 and the housing top part 4 can be connected to each other by means of a screw connection. Between the housing bottom part 3 and the housing top part 4, a seal element, for example, in the form of an O-ring, can be provided. The housing bottom part 3 and the housing top part 4 can be plastic components, in particular injection-molded plastic components. The housing bottom part 3 and the housing top part 4 can also be metal components, in particular diecast aluminum components. The filter module 1 is substantially configured with rotational symmetry to a center or symmetry axis 5.

The housing bottom part 3 comprises a cup-shaped filter element receiving region 6 which, in the orientation of FIGS. 1 to 4, is closed off in upward direction by the housing top part 4. The filter element receiving region 6 receives a filter element 7. The filter element 7 is exchangeable after removal of the housing top part 4. The filter element 7 is suitable for filtering particles or suspended substances from a fluid to be filtered, for example, fuel. The filter element 7 is a fuel filter element. The filter element 7 is also suitable for separating water W from the fluid to be filtered.

Aside from the filter element receiving region 6, the housing bottom part 3 comprises a water collection chamber 8 that is arranged, viewed along the direction of gravity g, below the filter element receiving region 6 and is configured to receive the water W that has been separated by means of the filter element 7. The water collection chamber 8 comprises a bottom 9 arranged at a slant and is slanted toward a water drainage channel 10. A pin 11 extends away from the bottom 9 in the direction toward the filter element receiving region 6. A fill level sensor 12 is associated with the water collection chamber 8. The fill level sensor 12 is suitable for sending a signal as soon as a fill level of the water W collected in the water collection chamber 8 has reached the fill level sensor 12.

A water drainage device 13 is provided at the water collection chamber 8 and is in fluid communication with the water drainage channel 10 for draining the water W from the water collection chamber 8. The water drainage device 13 can also be referred to as water drainage valve. The water drainage device 13 comprises a valve housing 14 that is embodied as one piece, in particular monolithically, with the housing bottom part 3. “One piece” or “one part” means in this context that the valve housing 14 and the housing bottom part 3 are not assembled of different components but form one component. “Monolithic” means in this context that the valve housing 14 and the housing bottom part 3 are manufactured throughout of the same material.

The valve housing 14 is hollow and encloses a stepped valve bore 15. The valve bore 15 widens viewed along the direction of gravity g. The valve bore 15 comprises a thread section 16 with an inner thread. A circumferential groove 17 is provided at the end of the thread section 16. The thread section 16 passes with a cone-shaped slant 18 into a cylindrical seal section 19. The water drainage channel 10 opens at the seal section 19.

At the end of the seal section 19, a disk-shaped valve seat 20 is provided. The valve bore 15 opens by means of a connection section 21 into a water drainage socket 22 which is integrally formed at the valve housing 14. The connection section 21 comprises a smaller inner diameter than the seal section 19. The water drainage channel 10 is closed off by means of a plug 23.

The valve bore 15 is configured with rotational symmetry to a center or symmetry axis 24. The symmetry axis 24 is positioned at a slant at a slant angle $\alpha$ in relation to the symmetry axis 5. The slant angle $\alpha$ is an acute angle. “Acute angle” is to be understood presently as an angle of less than 90°. For example, the slant angle $\alpha$ amounts to 10° to 20°.

The water drainage device 13 comprises a valve body 25 that is received in the valve bore 15. In this context, the valve body 25 is linearly movable within the valve bore 15 along the symmetry axis 24. The valve body 25 comprises—like the valve bore 15—a stepped geometry. The valve body 25 comprises a plate-shaped end section 26 whose outer diameter is larger than an inner diameter of the thread section 16. The end section 26 is adjoined by a counter thread section 27 corresponding to the thread section 16 and comprising an outer thread. The thread section 16 and the counter thread section 27 can be left-handed. At the counter thread section 27, a seal element 28, in particular an O-ring, is mounted immediately below the end section 26.

The counter thread section 27 is adjoined by a seal section 29 which is received in the seal section 19. Three seal elements 30 to 32, for example, O-rings, are mounted on the seal section 29. For this purpose, corresponding grooves can be provided at the valve body 25.

The valve body 25 is coupled by means of a coupling device 33 to an actuation rod 34. The coupling device 33 enables a torque transmission from the actuation rod 34 to the valve body 25. For this purpose, a first end section 35 of the actuation rod 34 is connected fixedly to the coupling device 33. For example, a form-fit and/or a material-fused connection can be provided. A form-fit connection is created by the mutual engagement or engagement from behind of at least two connection partners. In material-fused connections, the connection partners are held together by atomic or molecular forces. Material-fused connections are non-detachable connections that can only be separated by destruction of the connection means and/or of the connection partners. For example, the first end section 35 is glued to the coupling device 33.

A handwheel 37 is attached to a second end section 36 of the actuation rod 34. The handwheel 37 is located in the region of the housing top part 4 so that the water drainage device 13 can be operated from there. The actuation rod 34 is passed through an elastically deformable sleeve 38, in particular a rubber sleeve. A holder for the sleeve 38 can be formed integrally at the filter housing 2.

The coupling device 33 enables an alignment compensation. This is required because otherwise the actuation rod 34 upon moving the valve body 25 out of the valve housing 14 would be moved too far away from the filter housing 2 and could collide with other components, for example, in an engine compartment of a vehicle. Moreover, providing a coupling device 33 has the advantage that the actuation rod 34 at its distal end (i.e., remote from the valve body) can be arranged closer to the filter housing 2. For an angle between the longitudinal axis of the valve body 25 and the main longitudinal axis of the filter module 1 (corresponds to longitudinal axis of the inserted filter element) of 10°-20°, which can barely be produced still by a cutting machining action in upward direction, a straight actuation rod without joint would project too far away radially and would have no room in the installation space. The coupling device 33 saves therefore space and enables a smaller slant angle between the actuation rod and the main longitudinal axis of the filter module 1.

For this purpose, the coupling device 33 is configured as a cardan joint or universal joint connecting the valve body 25 to the actuation rod 34. However, any other arbitrary coupling or any other arbitrary joint can be used that enables an alignment compensation.

The coupling device 33 comprises an axle 39 integrally formed at the valve body 25 as well as a connection piece 40 that receives the first end section 35 of the actuation rod 34 and is fixedly connected thereto. An axle 41 is integrally formed at the connection piece 40. The axles 39, 41 are oriented perpendicularly to each other. The axles 39, 41 are connected to each other by means of a crosspiece or intermediate member 42. The intermediate member 42 comprises for this purpose cutouts or grooves into which the axles 39, 41 can be pressed or clipped.

The function of the water drainage device 13 will be explained in the following. In operation of the filter module 1, the filter element 7 separates water W which collects in the water collection chamber 8. As soon as the fill level of the water W in the water collection chamber 8 has reached the fill level sensor 12, the latter issues a corresponding signal. By means of the signal, for example, an acoustic and/or optical signal transmitter can be controlled by means of which a user is advised that in the water collection chamber 8 a maximum fill level of the water W is reached.

The user actuates then the water drainage device 13 in order to drain the water W from the water collection chamber 8. For this purpose, the user displaces the valve body 25 in the valve bore 15 along the symmetry axis 24 in upward direction out of the valve bore 15 so that a fluid connection is produced between the water drainage channel 10 and the connection section 21. The water W then flows from the water drainage socket 22 into an environment of the filter module 1.

This is realized in that the seal element 31 mounted at the valve body 25 is lifted off its valve seat 20 due to the displacement of the valve body 25 along the symmetry axis 24. In doing so, the water drainage device 13 is transferred from its closed state Z1, in which the seal element 31 is contacting the valve seat 20 and in which the seal element 32 seals radially in relation to the connection section 21, into an open state Z2, in which the seal element 31 is lifted off the valve seat 20 and in which the seal element 32 has been moved out of the connection section 21. In the open state Z2, the seal element 30 seals in relation to the slant 18. In the closed state Z1, the seal element 30 is moved into the seal section 19 and seals radially in relation to the latter. Moreover, the seal element 28 seals in the closed state axially and radially in relation to the groove 17.

Since the water drainage socket 22 leads out of the valve bore 15, the water W flows through the water drainage channel 10 into the seal section 19 and from there through the connection section 21 into the water drainage socket 22. Due to the slanted bottom 9 of the water collection chamber 8, the latter is completely emptied. After emptying the water collection chamber 8, the water drainage device 13 is returned again into the closed state Z1.

Transferring the water drainage device 13 from the closed state Z1 into the open state Z2 and in reverse is realized in that the user rotates the handwheel 37. Due to the interaction of the thread section 16 of the valve bore 15 with the corresponding counter thread section 27, the valve body 25 is displaced then along the symmetry axis 24 out of the valve bore 15 and back into it again.

Upon transfer of the water drainage device 13 from the closed state Z1 into the open state Z2, the valve body 25 moves opposite to the direction of gravity g out of the valve bore 15. In this way, the valve body 25 moves with its end section 26 laterally away from the symmetry axis 5 at the same time. By means of the coupling device 33, this movement can be compensated in such a way that the actuation rod 34 with the handwheel 37 is not moved by the same amount laterally so as not to collide with other components.

The water drainage device 13 has the advantage that, by means of the handwheel 37, it is easily accessible from above whereby at the same time a minimal installation space is required because the coupling device 33 enables an alignment compensation.

EMPLOYED REFERENCE CHARACTERS

1 filter module
2 filter housing
3 housing bottom part
4 housing top part
5 symmetry axis
6 filter element receiving region
7 filter element
8 water collection chamber
9 bottom
10 water drainage channel
11 pin
12 fill level sensor
13 water drainage device
14 valve housing
15 valve bore
16 thread section
17 groove
18 slant
19 seal section
20 valve seat
21 connection section
22 water drainage socket
23 plug
24 symmetry axis
25 valve body
26 end section
27 counter thread section
28 seal element
29 seal section
30 seal element
31 seal element
32 seal element
33 coupling device
34 actuation rod
35 end section
36 end section
37 handwheel
38 sleeve
39 axle
40 connection piece
41 axle
42 intermediate member
g direction of gravity
W water
Z1 state
Z2 state
α slant angle

What is claimed is:

1. A filter module comprising:
a filter housing comprising a housing top part and a housing bottom part; and
a water drainage device comprising:
a valve housing comprising a valve bore;
a valve body received at least in sections thereof in the valve bore;
an actuation rod configured to actuate the valve body; and
a coupling device operatively connecting the actuation rod with the valve body and configured to enable a tilting movement of the actuation rod in relation to the valve body;
wherein the valve body, upon transfer of the water drainage device from the closed state, in which the valve body seals in relation to a valve seat of the valve bore, into the open state, in which the valve body is lifted off the valve seat and moves toward the housing top part of the filter housing wherein the water drainage device is arranged external to the housing bottom part;
wherein a symmetry axis of the filter module and a symmetryaxis of the valve bore are slanted at a slant angle relative to each other, wherein the slant angle is an acute angle.

2. The filter module according to claim 1, wherein the valve body, when the water drainage device is transferred from the closed state into the open state, moves linearly along a symmetry axis of the valve bore and moves away from the valve seat in an upward direction opposite or at a slant to a direction of gravity.

3. The filter module according to claim 2, wherein the valve bore widens viewed opposite to the direction of gravity.

4. The filter module according to claim 1, wherein the coupling device comprises a first axle and a second axle, wherein the actuation rod is configured to tilt about the first axle in relation to the valve body and is configured to tilt about the second axle in relation to the valve body, and wherein the first axle and the second axle are oriented perpendicularly to each other.

5. The filter module according to claim 4, further comprising a connection piece connected to the actuation rod, wherein the first axle is mounted at the valve body, and wherein the second axle is mounted at the connection piece.

6. The filter module according to claim 4, wherein the coupling device comprises an intermediate member connected to the first axle and to the second axle.

7. The filter module according to claim 1, wherein the valve bore comprises a thread section and wherein the valve body comprises a counter thread section that corresponds to the thread section of the valve bore, wherein the thread section of the valve bore and the counter thread section of the valve body interact with each other to convert a rotational movement of the valve body in relation to the valve housing into a linear movement of the valve body in the valve bore.

8. The filter module according to claim 1, wherein the actuation rod comprises a handwheel arranged at an end of the actuation rod remote from the coupling device.

9. The filter module according to claim 1, wherein the valve body comprises a first seal element configured to seal axially in relation to the valve seat in the closed state and further configured to be lifted off the valve seat in the open state.

10. The filter module according to claim 9, wherein the valve body comprises a second seal element configured to seal radially in relation to a connection section of the valve bore in the closed state, wherein the second seal element is arranged outside of the connection section of the valve bore in the open state.

11. The filter module according to claim 1, wherein the valve bore passes completely through the valve housing so that the valve housing is open at both end faces thereof.

12. The filter module according to claim 1, further comprising a water drainage channel opening into the valve bore and further comprising a water drainage socket leading out of the valve bore, wherein the valve body interrupts a fluid connection between the water drainage channel and the water drainage socket in the closed state, and wherein the valve body releases the fluid connection between the water drainage channel and the water drainage socket in the open state.

13. The filter module according to claim 1, wherein the housing bottom part comprises a water collection chamber.

14. The filter module according to claim 1, wherein the water draining device is in fluid communication with the water collection chamber through the housing bottom part.

* * * * *